(12) United States Patent
Tan et al.

(10) Patent No.: US 10,338,854 B2
(45) Date of Patent: Jul. 2, 2019

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventors: Kok-Yong Tan, Miaoli County (TW); Horng-Sheng Yan, Penghu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/846,830

(22) Filed: Sep. 7, 2015

(65) Prior Publication Data

US 2017/0024136 A1  Jan. 26, 2017

(30) Foreign Application Priority Data

Jul. 21, 2015  (TW) .............................. 104123602 A

(51) Int. Cl.
*G06F 12/02* (2006.01)
*G06F 3/06* (2006.01)

(52) U.S. Cl.
CPC .......... *G06F 3/0679* (2013.01); *G06F 3/0616* (2013.01); *G06F 3/0652* (2013.01); *G06F 12/0246* (2013.01); *G06F 12/0253* (2013.01); *G06F 3/0659* (2013.01); *G06F 2212/7205* (2013.01)

(58) Field of Classification Search
CPC ...................... G06F 12/0246; G06F 2212/7205
See application file for complete search history.

(56) References Cited

U.S. PATENT DOCUMENTS 8,949,555 B1* 2/2015 Karamcheti ........ G06F 12/0246
                                                                  711/158
2008/0034175 A1* 2/2008 Traister ............... G06F 12/0246
                                                                  711/159

(Continued)

FOREIGN PATENT DOCUMENTS

CN          104714893          6/2015

OTHER PUBLICATIONS

Office Action of China Counterpart Application, dated Nov. 27, 2018, pp. 1-14.

*Primary Examiner* — Edward J Dudek, Jr.
*Assistant Examiner* — Andrew Russell
(74) *Attorney, Agent, or Firm* — JCIPRNET

(57) ABSTRACT

A memory management method, a memory control circuit unit and a memory storage device are provided. In an exemplary embodiment, the memory management method includes: receiving a first write command and first write data and obtaining a first number; programming the first write data and moving first storage data stored in a plurality of first physical programming units, where a total number of the first physical programming units conforms to the first number; receiving a second write command and second write data and obtaining a second number; programming the second write data and moving second storage data stored in a plurality of second physical programming units, where a total number of the second physical programming units conforms to the second number; and erasing at least one physical erasing unit. Accordingly, waste of system resource in the data merging procedure may be reduced.

30 Claims, 9 Drawing Sheets

(56) References Cited

U.S. PATENT DOCUMENTS

| | | | |
|---|---|---|---|
| 2011/0055455 A1* | 3/2011 | Post | G06F 12/0246 |
| | | | 711/103 |
| 2011/0202578 A1* | 8/2011 | Asano | G06F 12/0246 |
| | | | 707/813 |
| 2014/0379973 A1* | 12/2014 | Feldman | G06F 12/0253 |
| | | | 711/103 |
| 2015/0169442 A1* | 6/2015 | Fisher | G06F 12/0253 |
| | | | 711/103 |

* cited by examiner

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104123602, filed on Jul. 21, 2015. The entirety of the above-mentioned patent application is hereby incorporated by reference herein and made a part of this specification.

BACKGROUND

Technical Field

The disclosure relates to a memory management mechanism, and more particularly, to a memory management method, a memory control circuit unit and a memory storage device.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage device which utilizes a flash memory as its storage medium. For these reasons, the flash memory has become an import part of the electronic industries.

Generally, the memory storage device releases available physical erasing units by performing a garbage collection procedure so that new data may be stored. During the garbage collection procedure, the memory storage device determines how many units of data should be collected at background per each unit of data being written according to a predetermined garbage collection ratio value. However, the use of the predetermined garbage collection ratio value is unable to instantly increase or decrease the number of physical programming units to which valid data are to be retrieved in response to a storage state of the valid data (e.g., a data volume of the valid data) in the memory storage device, resulting in waste of system resource or pointless dropping of data access speed.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory management method, a memory control circuit unit and a memory storage device, which are capable of improving the issue regarding waste of system resource in the data merging procedure.

According to an exemplary embodiment of the disclosure, a memory management method for a rewritable non-volatile memory module is provided. The rewritable non-volatile memory module includes a plurality of physical programming units, the physical programming units constitute a plurality of physical erasing units, and the memory management method includes: receiving a first write command and first write data corresponding to the first write command and obtaining a first number; programming at least part of the first write data and moving first storage data stored in a plurality of first physical programming units among the physical programming units, wherein a total number of the first physical programming units conforms to the first number; after the first write command is received, receiving a second write command and second write data corresponding to the second write command and obtaining a second number, wherein the second number is different from the first number; programming at least part of the second write data and moving second storage data stored in a plurality of second physical programming units among the physical programming units, wherein a total number of the second physical programming units conforms to the second number; and erasing at least one physical erasing unit among the physical erasing units, wherein the physical erasing unit being erased includes at least one physical programming unit among the first physical programming units or at least one physical programming unit among the second physical programming units.

According to another exemplary embodiment of the disclosure, a memory control circuit unit configured to control a rewritable non-volatile memory module is provided. The memory control circuit unit includes a host interface, a memory interface and a memory management circuit. The host interface is configured to couple to a host system. The memory interface is configured to couple to the rewritable non-volatile memory module, the rewritable non-volatile memory module includes a plurality of physical programming units, and the physical programming units constitute a plurality of physical erasing units. The memory management circuit is coupled to the host interface and the memory interface. The memory management circuit is configured to receive a first write command and first write data corresponding to the first write command and obtain a first number. The memory management circuit is further configured to send a first command sequence which instructs to program at least part of the first write data and move first storage data stored in a plurality of first physical programming units among the physical programming units. A total number of the first physical programming units conforms to the first number. After the first write command is received, the memory management circuit is further configured to receive a second write command and second write data corresponding to the second write command and obtain a second number. The second number is different from the first number. The memory management circuit is further configured to send a second command sequence which instructs to program at least part of the second write data and move second storage data stored in a plurality of second physical programming units among the physical programming units. A total number of the second physical programming units conforms to the second number. The memory management circuit is further configured to send a third command sequence which instructs to erase at least one physical erasing unit among the physical erasing units. The physical erasing unit being erased includes at least one physical programming unit among the first physical programming units or at least one physical programming unit among the second physical programming units.

Another exemplary embodiment of the disclosure provides a memory storage device, which includes a connection interface unit, a rewritable non-volatile memory module and a memory control circuit unit. The connection interface unit is configured to couple to a host system. The rewritable non-volatile memory module includes a plurality of physical programming units, and the physical programming units constitute a plurality of physical erasing units. The memory control circuit unit is coupled to the connection interface unit and the rewritable non-volatile memory module. The memory control circuit unit is configured to receive a first write command and first write data corresponding to the first write command and obtain a first number. The memory control circuit unit is further configured to send a first command sequence which instructs to program at least part of the first write data and move first storage data stored in a plurality of first physical programming units among the physical programming units. A total number of the first physical programming units conforms to the first number. After the first write command is received, the memory control circuit unit is further configured to receive a second write command and second write data corresponding to the second write command and obtain a second number. The second number is different from the first number. The memory control circuit unit is further configured to send a second command sequence which instructs to program at least part of the second write data and move second storage data stored in a plurality of second physical programming units among the physical programming units. A total number of the second physical programming units conforms to the second number. The memory control circuit unit is further configured to send a third command sequence which instructs to erase at least one physical erasing unit among the physical erasing units. The physical erasing unit being erased includes at least one physical programming unit among the first physical programming units or at least one physical programming unit among the second physical programming units.

Based on the above, the memory management method, the memory control circuit unit and the memory storage device provided by the disclosure are capable of moving the data from different number of the physical programming units in response to different write commands. Accordingly, issues regarding waste of system resource in the data merging procedure may be solved.

To make the above features and advantages of the present disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
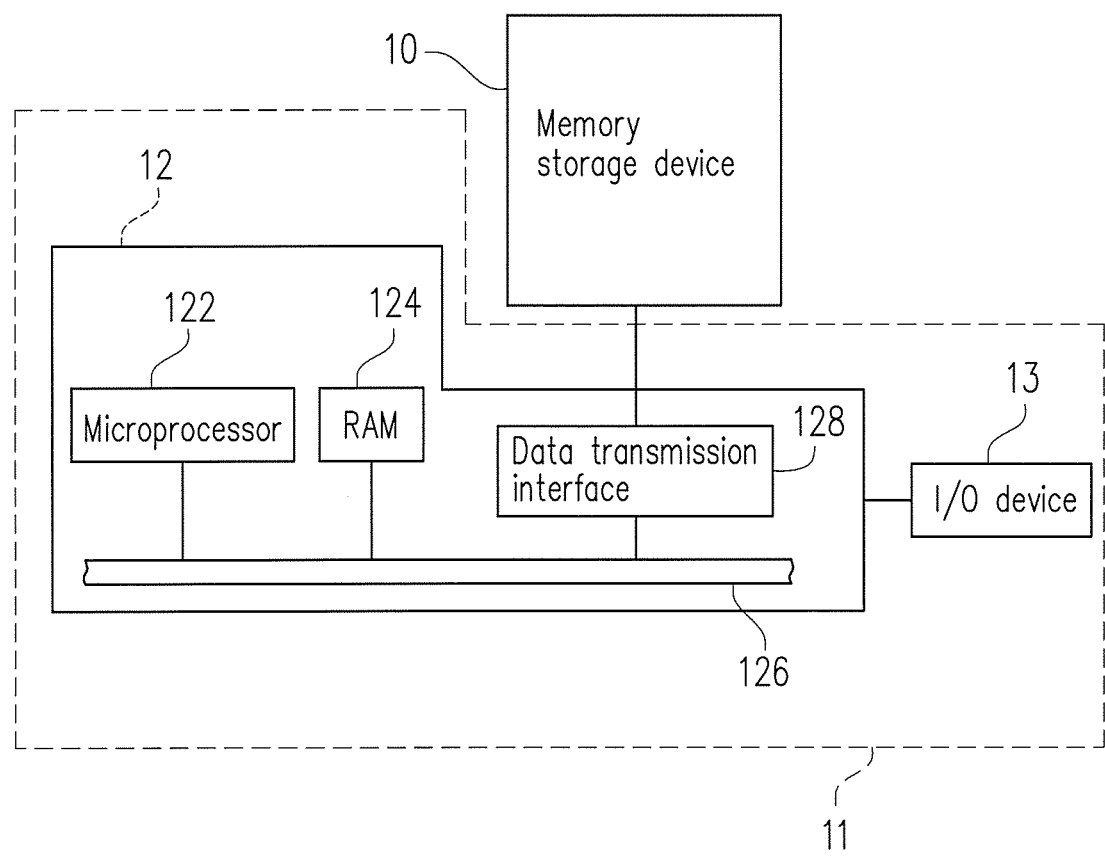
FIG. 1 is a schematic diagram illustrating a host system and a memory storage device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally, the memory storage device (also known as a memory storage system) includes a rewritable non-volatile memory module and a controller (also known as a control circuit). The memory storage device is usually configured together with a host system so that the host system may write data into the memory storage device or read data from the memory storage device.

Figure 2:
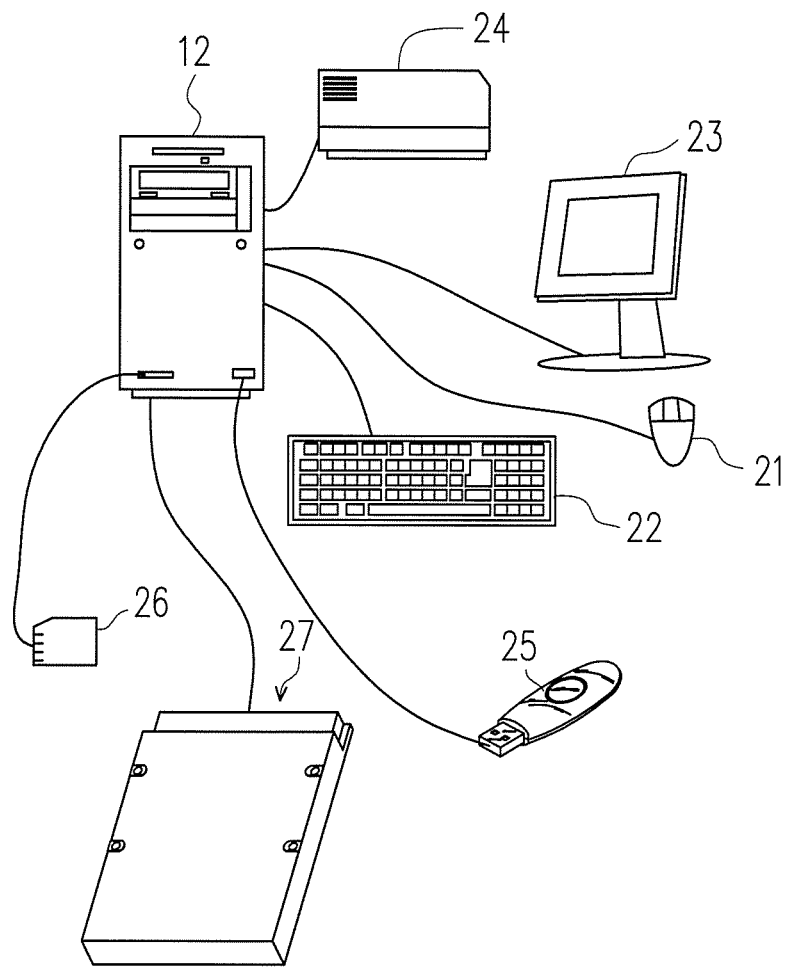
FIG. 2 is a schematic diagram of a computer, an input/output device, and a memory storage device according to an exemplary embodiment of the disclosure.

FIG. 1 is a schematic diagram illustrating a host system and a memory storage device according to an exemplary embodiment of the disclosure. FIG. 2 is a schematic diagram of a computer, an input/output device, and a memory storage device according to an exemplary embodiment of the disclosure.

Referring to FIG. 1, a host system 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In an exemplary embodiment, the memory storage device 10 is coupled to other devices of the host system 11 through the data transmission interface 128. By using the microprocessor 122, the random access memory 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
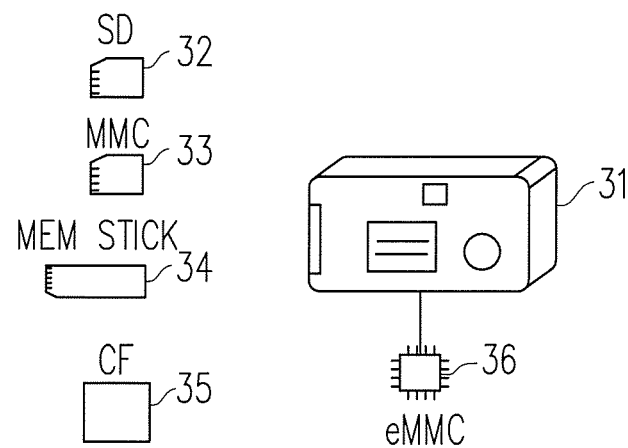
FIG. 3 is a schematic diagram illustrating a host system and a memory storage device according to an exemplary embodiment of the disclosure.

FIG. 3 is a schematic diagram illustrating a host system and a memory storage device according to an exemplary embodiment of the disclosure.

Generally, the host system 11 may substantially be any system capable of storing data with the memory storage device 10. Even though the host system 11 is illustrated as a computer system in the present exemplary embodiment, however, in another exemplary embodiment of the present disclosure, the host system 11 may be a digital camera, a video camera, a telecommunication device, an audio player, or a video player. For example, when the host system is a digital camera (video camera) 31, the rewritable non-volatile memory storage device may be a SD card 32, a MMC card 33, a memory stick 34, a CF card 35 or an embedded storage device 36 (as shown by FIG. 3). The embedded storage device 36 includes an embedded MMC (eMMC). It should be mentioned that the eMMC is directly coupled to a substrate of the host system.

Figure 4:
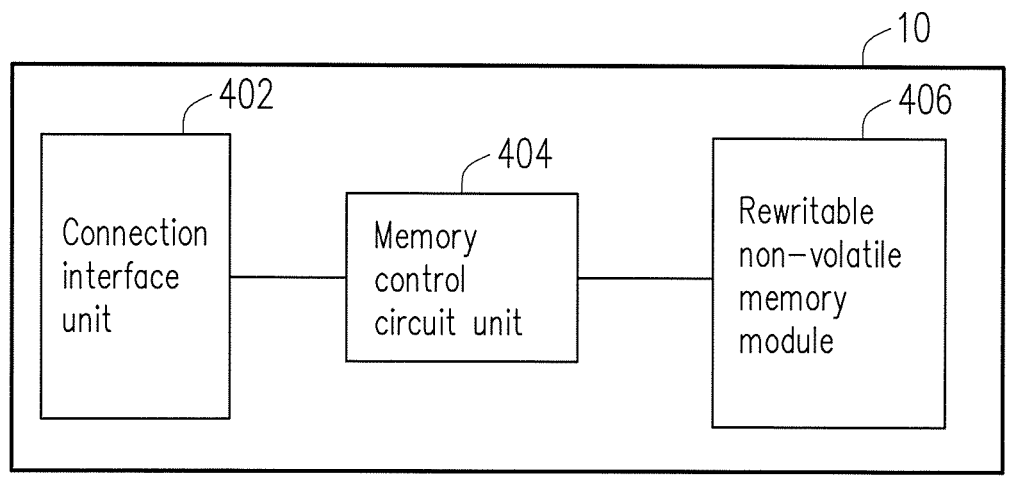
FIG. 4 is a schematic block diagram illustrating the memory storage device depicted in FIG. 1.

FIG. 4 is a schematic block diagram illustrating the memory storage device depicted in FIG. 1.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. However, the disclosure is not limited thereto, and the connection interface unit 402 may also be compatible to a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a Single Level Cell (SLC) NAND flash memory module (i.e., a flash memory module capable of storing one bit data in one memory cell), a Multi Level Cell (MLC) NAND flash memory module (i.e., a flash memory module capable of storing two bit data in one memory cell), a Triple Level Cell (TLC) NAND flash memory module (i.e., a flash memory module capable of storing three bit data in one memory cell), other flash memory modules or any memory module having the same features.

Figure 5:
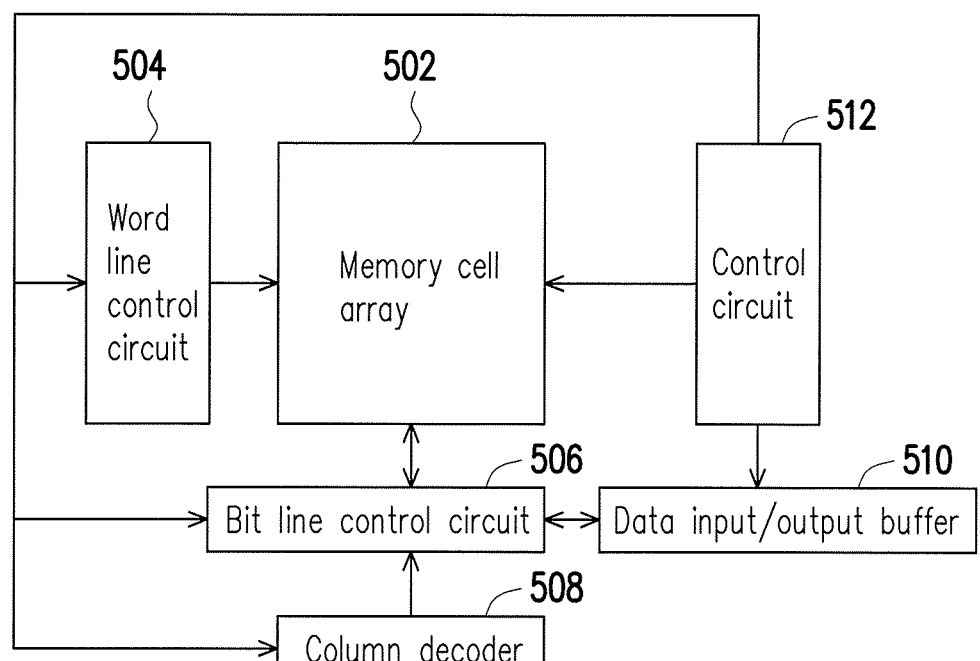
FIG. 5 is a schematic block diagram illustrating a rewritable non-volatile memory module according to an exemplary embodiment of the disclosure.
Figure 6:
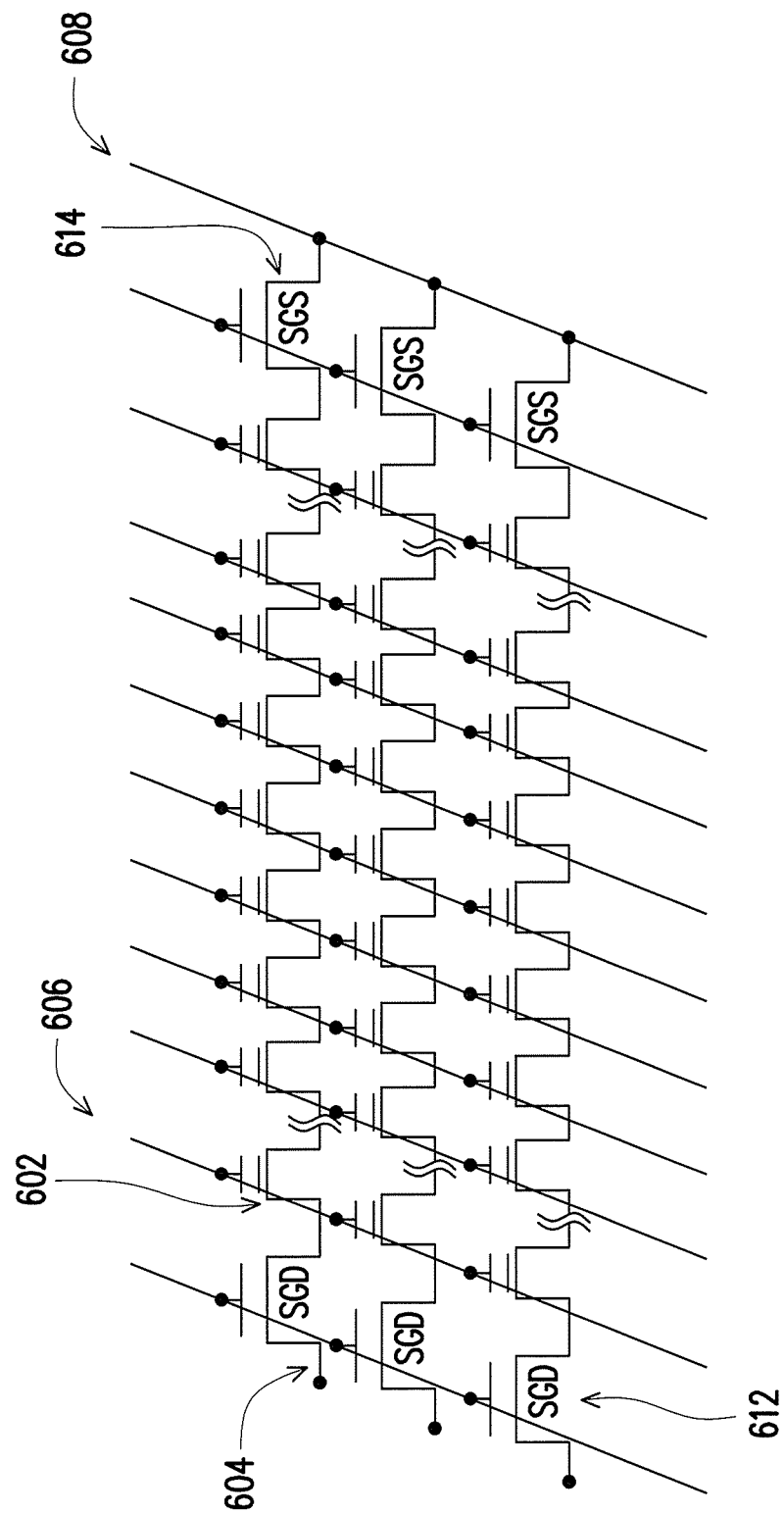
FIG. 6 is a schematic diagram illustrating a memory cell array according to an exemplary embodiment of the disclosure.

FIG. 5 is a schematic block diagram illustrating a rewritable non-volatile memory module according to an exemplary embodiment of the disclosure. FIG. 6 is a schematic diagram illustrating a memory cell array according to an exemplary embodiment of the disclosure.

Referring to FIG. 5, the rewritable non-volatile memory module 406 includes a memory cell array 502, a word line control circuit 504, a bit line control circuit 506, a column decoder 508, a data input/output buffer 510 and a control circuit 512.

In the present exemplary embodiment, the memory cell array 502 may include a plurality of memory cells 602 used to store data, a plurality of select gate drain (SGD) transistors 612, a plurality of select gate source (SGS) transistors 614, as well as a plurality of bit lines 604, a plurality of word lines 606, a common source line 608 connected to the memory cells (as shown in FIG. 6). The memory cell 602 is disposed at intersections of the bit lines 604 and the word lines 606 in a matrix manner (or in a 3D stacking manner). When a write command or a read command is received from the memory control circuit unit 404, the control circuit 512 controls the word line control circuit 504, the bit line control circuit 506, the column decoder 508, the data input/output buffer 510 to write the data into the memory cell array 502 or read the data from the memory cell array 502, wherein the word line control circuit 504 is configured to control voltages applied to the word lines 606, the bit line control circuit 506 is configured to control voltages applied to the bit lines 604, the column decoder 508 is configured to select the corresponding bit line according to a row address in a command, and the data input/output buffer 510 is configured to temporarily store the data.

Each of the memory cells in the rewritable non-volatile memory module 406 may store one or more bits by changing a threshold voltage of the memory cell. More specifically, in each of the memory cells, a charge trapping layer is provided between a control gate and a channel. Amount of electrons in the charge trapping layer may be changed by applying a write voltage to the control gate thereby changing the threshold voltage of the memory cell. This process of changing the threshold voltage is also known as "writing data into the memory cell" or "programming the memory cell". Each of the memory cells in the memory cell array 502 has a plurality of storage statuses depended on changes in the threshold voltage. Moreover, which of the storage statuses is the memory cell belongs to may be determined by read voltages, so as to obtain the one or more bits stored in the memory cell.

Figure 7:
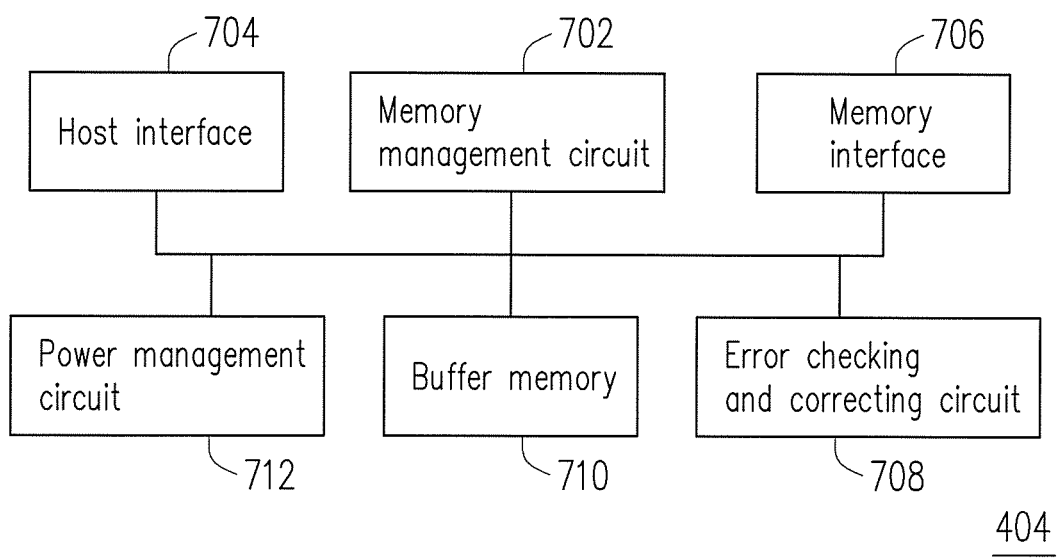
FIG. 7 is a schematic block diagram illustrating a memory control circuit unit according to an exemplary embodiment of the disclosure.

FIG. 7 is a schematic block diagram illustrating a memory control circuit unit according to an exemplary embodiment of the disclosure.

Referring to FIG. 7, the memory control circuit unit 404 includes a memory management circuit 702, a host interface 704 and a memory interface 706.

The memory management circuit 702 is configured to control overall operations of the memory control circuit unit 404. Specifically, the memory management circuit 702 has a plurality of control commands. During operations of the memory storage device 10, the control commands are executed to execute various operations such as writing, reading and erasing data. Hereinafter, operations of the memory management circuit 702 are described as equivalent to describe operations of the memory control circuit unit 404.

In the present exemplary embodiment, the control commands of the memory management circuit 702 are implemented in a form of a firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, the system area in a memory exclusively used for storing system data) of the rewritable non-volatile memory module 406. In addition, the memory management circuit 702 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 702 when the memory control circuit unit 404 is enabled. Thereafter, the control commands are executed by the microprocessor unit to execute operations of writing, reading or erasing data.

Further, in another exemplary embodiment, the control commands of the memory management circuit 702 may also be implemented in a form of hardware. For example, the memory management circuit 702 includes a microprocessor, a physical unit management circuit, a memory writing circuit, a memory reading circuit, a memory erasing circuit and a data processing circuit. The physical unit management circuit, the memory writing circuit, the memory reading circuit, the memory erasing circuit and the data processing circuit are coupled to the microprocessor. The physical unit management circuit is configured to manage the physical erasing units of the rewritable non-volatile memory module 406; the memory writing circuit is configured to issue a write command sequence to the rewritable non-volatile memory module 406 in order to write data into the rewritable non-volatile memory module 406; the memory reading circuit is configured to issue a read command sequence to the rewritable non-volatile memory module 406 in order to read data from the rewritable non-volatile memory module 406; the memory erasing circuit is configured to issue an erase command sequence to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406. Each of the write command sequence, the read command sequence and the erase command sequence may include one or more program codes or command codes, respectively, and instruct the rewritable non-volatile memory module 406 to perform the corresponding operations, such as writing, reading and erasing.

The host interface 704 is coupled to the memory management circuit 702 and configured to receive and identify commands and data sent from the host system 11. In other words, the commands and data sent from the host system 11 are passed to the memory management circuit 702 through the host interface 704. In the present exemplary embodiment, the host interface 704 is compatible with the SATA standard. However, it should be understood that the present disclosure is not limited thereto, and the host interface 704 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 706 is coupled to the memory management circuit 702 and configured to access the rewritable non-volatile memory module 406. That is, data to be written to the rewritable non-volatile memory module 406 is converted to a format acceptable to the rewritable non-volatile memory module 406 through the memory interface 706. Specifically, if the memory management circuit 702 intends to access the rewritable non-volatile memory module 406, the memory interface 706 sends corresponding command sequences. For example, the command sequences may include the write command sequence which instructs to write data, the read command sequence which instructs to read data, the erase command sequence which instructs to erase data, and other corresponding command sequences configured to instruct performing various memory operations (e.g., for changing read voltage levels or performing a data merging procedure). Detailed descriptions regarding the above are omitted herein. These command sequences are generated by the memory management circuit 702 and transmitted to the rewritable non-volatile memory module 406 through the memory interface 706, for example. The command sequences may include one or more signals, or data stored in the bus. The signals or the data may include command codes and programming codes. For example, in a read command sequence, information such as identification codes and memory addresses are included.

In an exemplary embodiment, the memory control circuit unit 404 further includes an error checking and correcting circuit 708, a buffer memory 710 and a power management circuit 712.

The error checking and correcting circuit 708 is coupled to the memory management circuit 702 and configured to execute an error checking and correcting process to ensure the correctness of data. Specifically, when the memory management circuit 702 receives the write command from the host system 11, the error checking and correcting circuit 708 generates an error correcting code (ECC) and/or an error detecting code (EDC) for data corresponding to the write command, and the memory management circuit 702 writes data and the ECC and/or the EDC corresponding to the data to the rewritable non-volatile memory module 406. Later, when the memory management circuit 702 reads the data from the rewritable non-volatile memory module 406, the corresponding ECC and/or the EDC are also read, and the error checking and correcting circuit 708 executes the error checking and correcting procedure on the read data based on the ECC and/or the EDC.

The buffer memory 710 is coupled to the memory management circuit 702 and configured to temporarily store data and commands from the host system 11 or data from the rewritable non-volatile memory module 406.

The power management unit 712 is coupled to the memory management circuit 702 and configured to control a power of the memory storage device 10.

Figure 8:
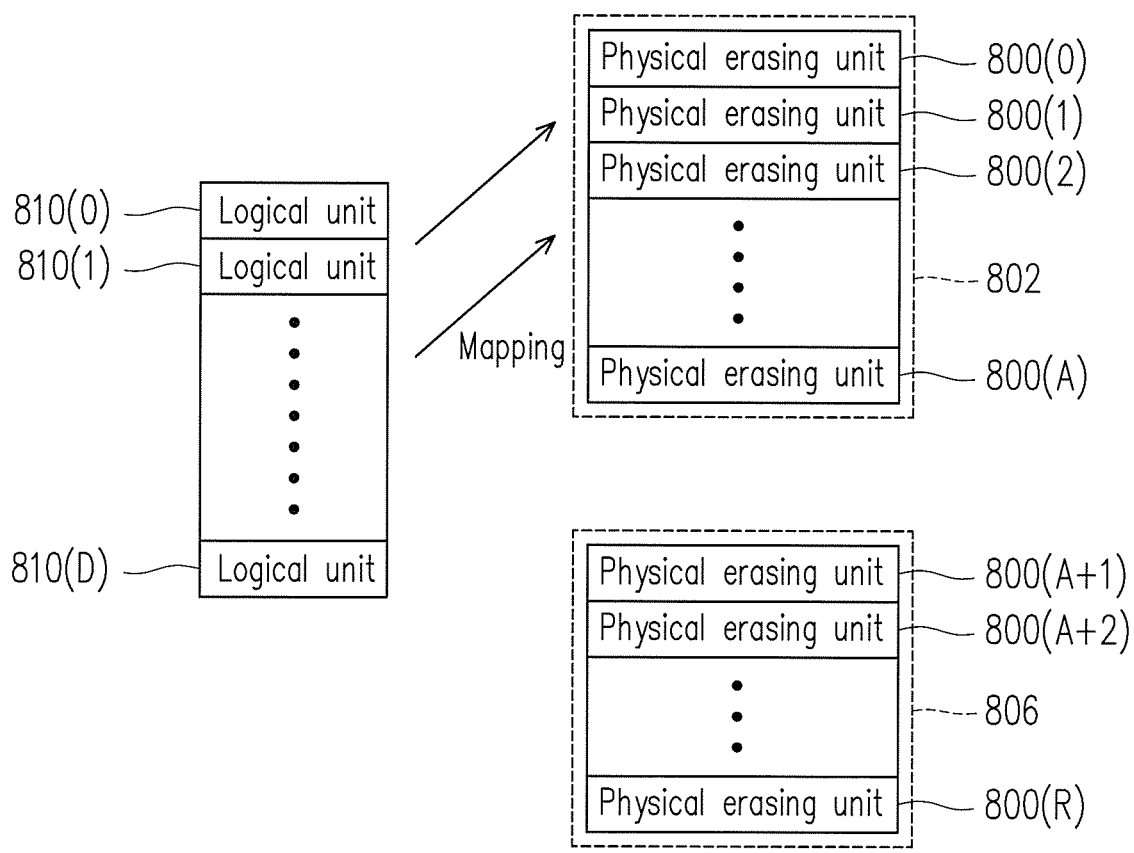
FIG. 8 is a schematic diagram illustrating management of a rewritable non-volatile memory module according to an exemplary embodiment of the disclosure.

FIG. 8 is a schematic diagram illustrating management of a rewritable non-volatile memory module according to an exemplary embodiment of the disclosure. It should be understood that terms, such as "select", "group", "divide", "associate" and so forth, are logical concepts which describe operations in the physical erasing units of the rewritable non-volatile memory module 406. That is, the physical erasing units of the rewritable non-volatile memory module are logically operated, but actual positions of the physical units of the rewritable non-volatile memory module are not changed.

The memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells may store more than two bits, the physical programming units on the same word line may be at least classified into a lower physical programming unit and an upper physical programming unit. For instance, in the MLC NAND-type flash memory, a least signifimayt bit (LSB) of one memory cell belongs to the lower physical programming unit, and a most signifimayt bit (MSB) of one memory cell belongs to the upper physical programming unit. Generally, a writing speed of the lower physical programming unit is higher than a writing speed of the upper physical programming unit, or a reliability of the lower physical programming unit is higher than a reliability of the upper physical programming unit.

In the present exemplary embodiment, the physical programming unit is a minimum unit for programming. That is, the programming unit is the minimum unit for writing data. For example, the physical programming unit is a physical page or a physical sector. When the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, the data bit area contains 32 physical sectors, and a size of each physical sector is 512-byte (B). However, in other exemplary embodiments, the data bit area may also include 8, 16 physical sectors or different number (more or less) of the physical sectors, and the size of each physical sector may also be greater or smaller. On the other hand, the physical erasing unit is the minimal unit for erasing. Namely, each physical erasing unit contains the least number of memory cells to be erased together. For instance, the physical erasing unit is a physical block.

Referring to FIG. 8, the memory management circuit 702 may logically divide the physical erasing units 800(0) to 800(R) of the rewritable non-volatile memory module 406 into a plurality of areas such as a storage area 802 and a system area 806.

The physical erasing units in the storage area 802 are configured to store data (i.e., the user data) from the host system 11. The storage area 802 stores valid data and invalid data. For example, when the host system 11 intends to delete one valid data, the data being deleted may still be stored in the storage area 802 but marked as the invalid data. In the following exemplary embodiment, the physical erasing unit not storing the valid data is also known as a spare physical erasing unit. For example, the erased physical erasing unit becomes the spare physical erasing unit. Further, in the following exemplary embodiment, the physical erasing unit storing the valid data is also known as a non-spare physical erasing unit.

In an exemplary embodiment, if there are damaged physical erasing units in the storage area 802 or the system area 806, the physical erasing units in the storage area 802 may also be used to replace the damaged physical erasing units. If there are no available physical erasing units in the storage area 802 for replacing the damaged physical erasing units, the memory management circuit 702 may announce that the memory storage device 10 is in a write protect status, so that data may no longer be written thereto.

The physical erasing units in the system area 806 are configured to record system information including information related to manufacturer and model of a memory chip, an amount of physical erasing units in the memory chip, the number of the physical programming unit in each physical erasing unit, and so forth.

In an exemplary embodiment, amounts of the physical erasing units in the storage area 802 and the system area 806 may be different based on different memory specifications. In addition, it should be understood that, during operations of the memory storage device 10, grouping relations of the physical erasing units associated to the storage area 802 and the system area 806 may be dynamically changed. For example, when damaged physical erasing units in the system area 806 are replaced by the physical erasing units in the storage area 802, the physical erasing units originally in the storage area 802 are then associated to the system area 806.

In the present exemplary embodiment, the memory management circuit 702 configures logical units 810(0) to 810 (D) for mapping to the physical erasing units 800(0) to 800(A) in the storage area 802. For example, in the present exemplary embodiment, the host system 11 accesses the data stored in the storage area 802 through a logical address. Therefore, each of the logical units 810(0) to 810(D) refers to one logical address. In addition, in another exemplary embodiment, each of the logical units 810(0) to 810(D) may also refer to one logical sector, one logical page, one logical erasing unit or a composition of a plurality of continuous or discontinuous logical addresses.

In the present exemplary embodiment, each of the logical units 810(0) to 810(D) maps to one or more physical units. Each of the physical units may refer to one physical programming unit, one physical erasing unit or a composition of a plurality of continuous or discontinuous physical addresses. The memory management circuit 702 records mapping relations between the logical units and the physical units into at least one logical-to-physical mapping table. When the host system 11 intends to read the data from the memory storage device 10 or write the data into the memory storage device 10, the memory management circuit 702 may access the data in the memory storage device 10 according to the logical-to-physical mapping table.

In the present exemplary embodiment, after the write command from the host system 11 is received, one physical erasing unit in the storage area 802 is used to store write data corresponding to the write command. For example, if the physical erasing unit currently used for storing the user data from the host system 11 in the storage area 802 is still sufficient in space, the write data may be stored into such physical erasing unit; and if the physical erasing unit currently used for storing the user data from the host system 11 in the storage area 802 is insufficient in space, the write data may be stored into another spare physical erasing unit.

In the present exemplary embodiment, the memory management circuit 702 determines whether a total number of the spare physical erasing units remained in the storage area 802 is sufficient. For example, the memory management circuit 702 determines whether the total number of the spare physical erasing units remained in the storage area 802 is equal to or less than a threshold value; if the total number of the spare physical erasing units remained in the storage area 802 is equal to or less than the threshold value, the memory management circuit 702 determines that the total number of the spare physical erasing units remained in the storage area 802 is insufficient; and if the total number of the spare physical erasing units remained in the storage area 802 is greater than the threshold value, the memory management circuit 702 determines that the total number of the spare physical erasing units remained in the storage area 802 is still sufficient.

In the present exemplary embodiment, the operation of determining whether the total number of the spare physical erasing units remained in the storage area 802 is sufficient is performed in response to the received write command. For example, the operation of determining whether the total number of the spare physical erasing units remained in the storage area 802 is sufficient is correspondingly performed each time when one write command is received. However, in another exemplary embodiment, the operation of determining whether the total number of the spare physical erasing units remained in the storage area 802 is sufficient may also be continuously performed at the background or only performed in response to changes in the number of the spare physical erasing units remained in the storage area 802 (e.g., when one specific spare physical erasing unit is selected for storing the data from the host system 11).

In an exemplary embodiment, the operation of determining whether the total number of the spare physical erasing units remained in the storage area 802 is equal to or less than one threshold value may be regarded as determining whether the total number of the spare physical erasing units remained in the storage area 802 conforms to a preset number. For example, if the total number of the spare physical erasing units remained in the storage area 802 is equal to or less than the threshold value, it is considered that the total number of the spare physical erasing units remained in the storage area 802 conforms to the preset number; and if the total number of the spare physical erasing units remained in the storage area 802 is greater than the threshold value, it is considered that the total number of the spare physical erasing units remained in the storage area 802 does not conform to the preset number.

In the present exemplary embodiment, if determining that the total number of the spare physical erasing units in the storage area 802 is insufficient, the memory management circuit 702 instructs the rewritable non-volatile memory module 406 to perform a data merging procedure. In the present exemplary embodiment, the data merging procedure is a garbage collection procedure, for example. Further, if determining that the total number of the spare physical erasing units in the storage area 802 is sufficient, the memory management circuit 702 may choose not to perform the data merging procedure.

In the data merging procedure, parts of the valid data distributed in the storage area 802 are collected and moved into specific physical erasing units, so as to release the new spare physical erasing units. If one specific data originally marked as the valid data is moved out from one non-spare physical erasing unit, the specific data is marked as the invalid data in such non-spare physical erasing unit. If all the valid data stored in one specific non-spare physical erasing unit are moved out (i.e., the data stored in the specific non-spare physical erasing unit are all marked as the invalid data), the specific non-spare physical erasing unit may be erased to become one spare physical erasing unit. In an exemplary embodiment, the operation of erasing one specific physical erasing unit may be regarded as releasing one spare physical erasing unit. On the other hand, the spare physical erasing unit used to store the collected valid data in the data merging procedure may become one non-spare physical erasing unit.

It is worth mentioning that, in the data merging procedure, in response to one write command which instructs to store one specific write data, a specific number of the physical programming units are selected and the valid data stored by these physical programming units are collected. Generally, said specific number is predetermined when the memory storage device left the factory, and the specific number is not correspondingly adjusted in response to a usage state of the memory storage device. In other words, regardless of how many of the valid data are stored in the memory storage device, each time when one data is written into the memory storage device, a part of the valid data is collected from a fixed number of the physical programming units. However, such data merging procedure is unable to instantly increase or decrease the number of physical programming units to which the valid data are to be retrieved in response to a storage state of the valid data (e.g., a data volume of the valid data) in the memory storage device, resulting in waste of system resource or pointless dropping of data access speed.

In the present exemplary embodiment, as in response to different write commands or the write data instructed to be stored by different write commands, the number of the physical programming units selected for collecting the data in the corresponding data merging procedure may be different each time.

Figure 9A:
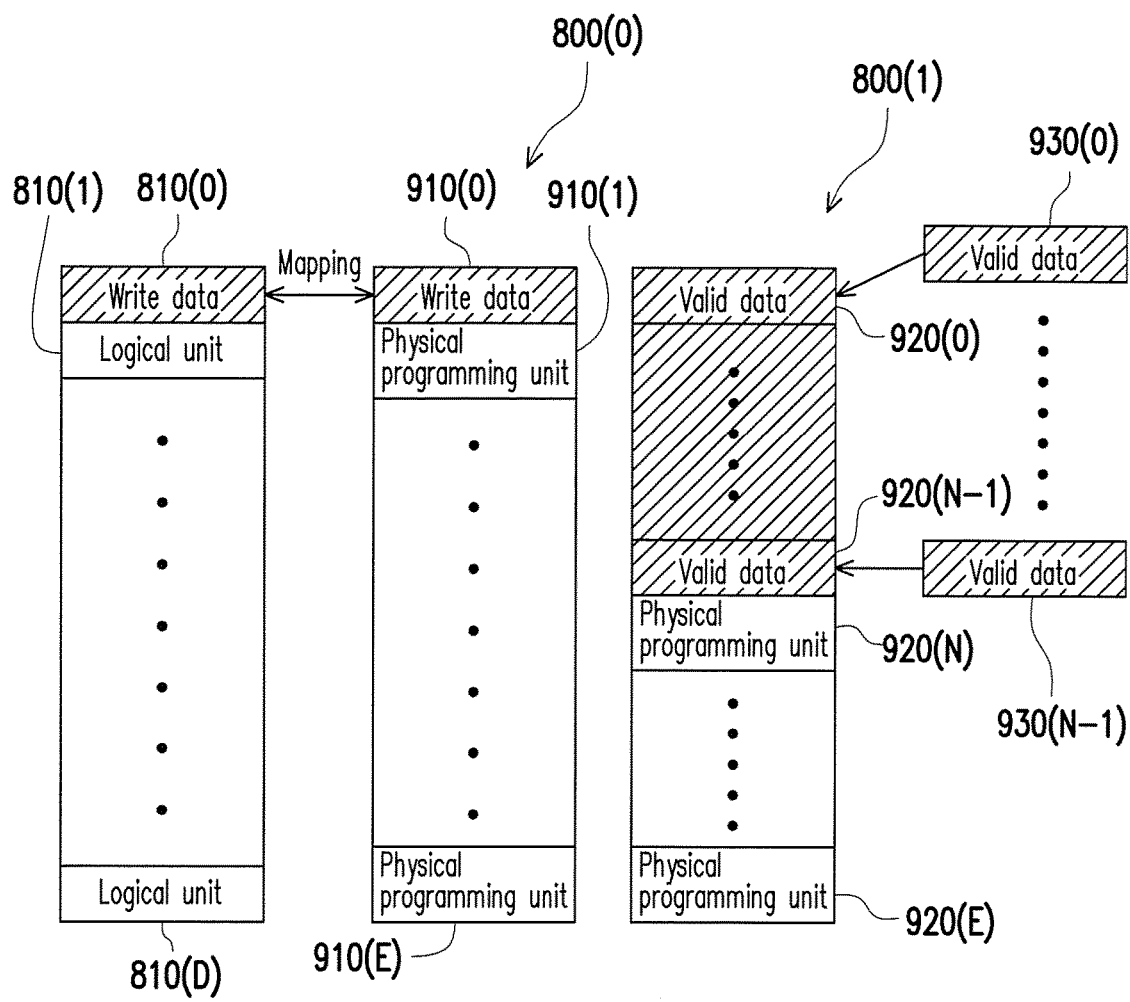
FIG. 9A and FIG. 9B are schematic diagrams illustrating a management of the memory according to an exemplary embodiment disclosure.
Figure 9B:
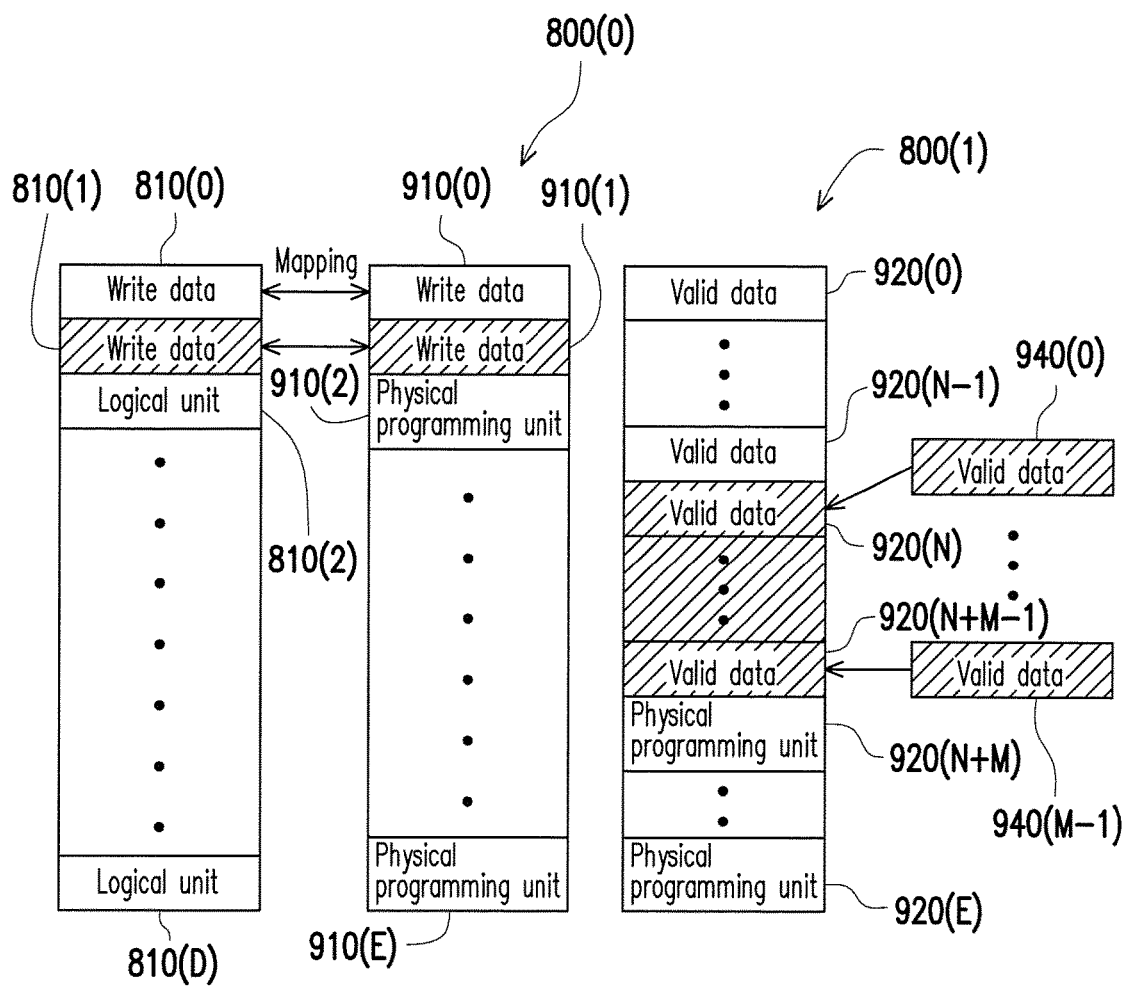

FIG. 9A and FIG. 9B are schematic diagrams illustrating a management of the memory according to an exemplary embodiment disclosure.

Referring to FIG. 9A, the memory management circuit 702 receives a write command (hereinafter, also known as a first write command) from the host system 11 and write data (hereinafter, also known as first write data) corresponding to the first write command. For example, in the present exemplary embodiment, it is assumed that the first write data is fully written into one physical programming unit. According to the first write command, the memory management circuit 702 instructs to write the first write data into the logical unit 810(0).

In the present exemplary embodiment, the memory management circuit 702 selects one physical erasing unit 800(0) from the storage area 802 to store the first write data and maps the logical unit 810(0) to the physical erasing unit 800(0). For example, assuming that the physical erasing unit 800(0) includes physical programming units 910(0) to 910(E), the memory management circuit 702 may instruct the rewritable non-volatile memory module 406 to store the first write data into the physical programming unit 910(0) and record a mapping relation between the logical unit 810(0) and the physical programming unit 910(0). However, in another exemplary embodiment, if one physical programming unit is insufficient in space for storing the first write data, the data stored in the physical programming unit 910(0) may only be a part of the first write data, and the rest of the first write data may be stored into the other physical programming units (e.g., any one physical programming unit among the physical programming units 910(1) to 910(E)).

In the present exemplary embodiment, in response to the first write command or that the physical erasing unit 800(0) is selected for storing the first write data, if the memory management circuit 702 determines that it is required to perform the data merging procedure to release the spare physical erasing units, the memory management circuit 702 obtains a specific number (hereinafter, also known as a first number). In the present exemplary embodiment, the first number is represented by N. Further, the memory management circuit 702 selects one physical erasing unit 800(1) from the storage area 802. According to the first number N, the memory management circuit 702 selects a N number of the physical programming units 930(0) to 930(N-1) from the storage area 802 and moves data (hereinafter, also known as first storage data) stored in the selected physical programming units 930(0) to 930(N-1) to the physical erasing unit 800(1). For example, in the present exemplary embodiment, because each of the physical programming units 930(0) to 930(N-1) is stored with the valid data, all the moved first storage data are the valid data, as shown in FIG. 9A. However, in another exemplary embodiment, it is also possible that the physical programming units 930(0) to 930(N-1) are stored with the invalid data, such that the moved first storage data may also include the invalid data. In addition, the physical programming units 930(0) to 930 (N-1) may be selected from among one or more physical erasing units. For example, assuming that the physical erasing unit 800(1) includes physical programming units 920(0) to 920(E), the memory management circuit 702 may read the first storage data from the physical programming units 930(0) to 930(N-1) and move the read first storage data into the physical programming units 920(0) to 920(N-1).

In the present exemplary embodiment, the first number N is obtained according to a physical unit count and a logical unit count (hereinafter, also known as a first logical unit count). The physical unit count is corresponding to a total number of a plurality of physical programming units for storing the data (i.e., the user data) from the host system 11 in the rewritable non-volatile memory module 406. In an exemplary embodiment, said physical unit count may be determined according to the number of the physical erasing units 800(0) to 800(A) in the storage area 802. For example, according to an exemplary embodiment of FIG. 8, the physical unit count may be directly set as A+1 (i.e., a total number of the physical erasing units 800(0) to 800(A) in the storage area 802). Alternatively, it is also possible that specific physical erasing units (e.g., the damaged physical erasing units) in the storage area 802 may be eliminated first so that the physical unit count may be determined according to the number of the physical erasing units remained in the storage area 802. For example, the physical unit count may be determined according to a total number of the available physical erasing units (e.g., non-damaged physical erasing units) in the storage area 802. The first logical unit count is corresponding to a total number of at least one logical unit (hereinafter, also known as first logical units) stored with the user data from the host system 11 when the first write command is received. For example, when the first write command is received, the memory management circuit 702 searches the usage state of the logical units at the time and determines the first logical unit count according to a total number of the first logical units stored with the user data from the host system 11. For example, the first logical unit count may be equal to the total number of the first logical units searched by the memory management circuit 702 when the first write command is received.

In an exemplary embodiment, in order to facilitate the calculation, the memory management circuit 702 may also convert the physical unit count and the first logical unit count into corresponding volumes, respectively. The memory management circuit 702 may obtain the first number N according to a volume (hereinafter, also known as a physical volume) corresponding to the physical unit count and a volume (hereinafter, also known as a first logical volume) corresponding to the first logical unit count. For example, in an exemplary embodiment where the physical unit count is A+1, the corresponding physical volume may be a total volume of the physical erasing units 800(0) to 800(A). Further, the first logical volume may also be regarded as a total data volume of the valid data stored in the rewritable non-volatile memory module 406 when the first write command is received.

In an exemplary embodiment, the memory management circuit 702 subtracts the first logical volume from the physical volume to obtain a difference value (hereinafter, also known as a first difference value); and then, the memory management circuit 702 obtains the first number N according to the physical volume and the first difference value. For example, the memory management circuit 702 may divide the physical volume by the first difference value to obtain the first number N. For example, the first number N may be calculated according to an equation (1.1) below:

$$N = \frac{P}{P - L_1} \qquad (1.1)$$

Herein, N is the first number, P is the physical volume, and $L_1$ is the first logical volume. Each of N, P and $L_1$ is a positive number. If the first number N calculated according to the equation (1.1) is not a positive integer, operations (e.g., calculating for Gauss value or rounding up to decimal places) may further be performed on a result of the equation (1.1). However, in another exemplary embodiment, the physical volume P and the first logical volume $L_1$ may also be inputted to an algorithm or a look-up able, and an output of the algorithm or the look-up table may be used as the first number N. Further, in another exemplary embodiment, additional logical operations may also be added in aforesaid calculation for the first number N.

In another exemplary embodiment, the first number N is obtained according to a reference count, aforesaid physical volume and a data volume (hereinafter, also known as a first storage data volume). The reference count is corresponding to a total number of the physical programming units included in each of the physical erasing units in the rewritable non-volatile memory module 406. For example, assuming that each of the physical erasing units in the rewritable non-volatile memory module 406 includes 256 physical programming units, the reference count may be set to 256. The first storage data volume is corresponding to a data volume of valid data or invalid data stored in the rewritable non-volatile memory module 406 when the first write command is received. For example, the first number N may be calculated according to equations (2.1) and (2.2) below:

$$X_1 = \frac{S_1}{P} \times R \qquad (2.1)$$

$$N = \frac{R}{X_1} \qquad (2.2)$$

Herein, $S_1$ represents a data volume of the invalid data stored in the rewritable non-volatile memory module 406 when the first write command is received, R is the reference count, and $X_1$ represents an average data volume of the invalid data stored in each physical erasing unit in the rewritable non-volatile memory module 406 when the first write command is received. In addition, operations (e.g., calculating for Gauss value or rounding up to decimal places) may also be performed on calculation results of the equations (2.1) and (2.2) or any one of the parameters being used. Alternatively, in another exemplary embodiment, simply replacing the parameter $S_1$ in the equation (2.1) by the first logical unit volume $L_1$ used in the equation (1.1), the demand of using the data volume of the valid data stored in the rewritable non-volatile memory module 406 when the first write command is received as the first storage volume may be satisfied accordingly. Accordingly, the corresponding first number N may be obtained according to the average data volume of the valid data (or the invalid data) stored in each physical erasing unit in the rewritable non-volatile memory module 406 when the first write command is received.

In other words, in the foregoing exemplary embodiments, the first number N is instantly determined in response to the usage state of the logical units at the time when the first write command is received. Further, if one specific logical unit is stored with data and such data is not deleted by the host system 11, the specific logical unit is mapped to at least one physical unit (e.g., one specific physical programming unit) stored with the valid data. Therefore, in an exemplary embodiment, the first number N may also be regarded as being instantly determined in response to the storage state of the valid data (or the invalid data) stored in the rewritable non-volatile memory module 406 when the first write command is received.

In an exemplary embodiment, the first number N may also be regarded as being obtained according to a relation between a volume of at least one logical unit stored with data at a specific time-point (hereinafter, also known as a first time-point) and a rated volume provided by the rewritable non-volatile memory module 406 for storing the user data. The rated volume refers to an upper limit of the volume provided by the rewritable non-volatile memory module 406 for the host system 11 to store data. For example, according to an exemplary embodiment of FIG. 8, the rated volume may be equal to a total volume of the logical units 810(0) to 810(D). In an exemplary embodiment, the rated volume may change based on different formatting procedures corresponding to the rewritable non-volatile memory module 406. In addition, the first time-point refers to a time-point when the first write command is received or when related information is searched according to the first write command.

Next, referring to FIG. 9B, after the first write command is received, the memory management circuit 702 receives another write command (hereinafter, also known as a second write command) and write data (hereinafter, also known as second write data) corresponding to the second write command. For example, in the present exemplary embodiment, it is assumed that the second write data is fully written into one physical programming unit. According to the second write command, the memory management circuit 702 instructs to write the second write data into the logical unit 810(1).

It is worth mentioning that, in this exemplary embodiment, it is assumed that the first write data and the second write data belong to sequential data, and therefore the logical unit 810(1) for storing the second write data is arranged after the logical unit 810(0) for storing the first write data. However, in another exemplary embodiment, it is possible that the first write data and the second write data are not the sequential data, such that the logical unit for storing the second write data may not be arranged after the logical unit for storing the first write data. Further, the specific logical unit arranged after another logical unit as mentioned above refers to a starting logical address of the specific logical unit is a continuation to an ending logical address of the another logical unit.

In the present exemplary embodiment, according to the second write command, the memory management circuit 702 selects one physical erasing unit from the storage area 802 to store the second write data. In the present exemplary embodiment, the physical erasing unit 800(0) is not fully written, and therefore the physical erasing unit 800(0) is selected again to store the second write data so that the logical unit 810(1) is also mapped to the physical erasing unit 800(0). For example, the memory management circuit 702 may instruct the rewritable non-volatile memory module 406 to store the second write data into the physical programming unit 910(1) and record a mapping relation between the logical unit 810(1) and the physical programming unit 910(1). However, in another exemplary embodiment, if the physical erasing unit previously selected to store the user data from the host system 11 is already or almost fully written, another spare physical erasing unit will be selected to store the second write data. Further, in another exemplary embodiment, if one physical programming unit is insufficient in space for storing the second write data, the data stored in the physical programming unit 910(1) may only be a part of the second write data, and the rest of the second write data may also be stored into the other physical programming units (e.g., any one physical programming unit among the physical programming units 910(2) to 910(E)).

On the other hand, according to the second write command, if the memory management circuit 702 determines that it is required to continue the data merging procedure (i.e., the number of the spare physical erasing units in the storage area 802 is still insufficient), the memory management circuit 702 obtains another number (hereinafter, also known as a second number). Herein, the second number may be identical to or may be different from the first number. In the present exemplary embodiment, the second number is represented by M. According to the second number M, the memory management circuit 702 selects a M number of physical programming units 940(0) to 940(M−1) and collects data (hereinafter, also known as second storage data) from the M number of physical programming units 940(0) to 940(M−1). In the present exemplary embodiment, each of the M number of physical programming units 940(0) to 940(M−1) is stored with the valid data, such that all the collected second storage data are the valid data, as shown in FIG. 9B. However, in another exemplary embodiment, it is also possible that the M number of physical programming units 940(0) to 940(M−1) are stored with the invalid data, such that the moved second storage data may also include the invalid data. In addition, the physical programming units 940(0) to 940(M−1) may also be selected from among one or more physical erasing units.

In the present exemplary embodiment, the memory management circuit 702 selects one physical erasing unit from the storage area 802 to store the collected second storage data. In the present exemplary embodiment, it is assumed that the previously selected physical erasing unit 800(1) is not fully written, such that the memory management circuit 702 selects the physical erasing unit 800(1) again to store the collected second storage data. As shown in FIG. 9B, the memory management circuit 702 reads the second storage data from the physical programming units 940(0) to 940 (M−1) and moves the second storage data to the physical programming units 920(N) to 920(N+M−1). However, in another exemplary embodiment of FIG. 9B, if the previously selected physical erasing unit 800(1) is already or almost fully written, the memory management circuit 702 may also select other physical erasing units to store the collected second storage data.

In the present exemplary embodiment, the second number M is obtained according to aforesaid physical unit count and another logical unit count (hereinafter, also known as a second logical unit count). The second logical unit count is corresponding to a total number of at least one logical unit (hereinafter, also known as second logical units) stored with the user data from the host system 11 when the second write command is received. For example, when the second write command is received, the memory management circuit 702 searches the usage state of the logical units at the time and determines the second logical unit count according to a total number of the second logical units stored with the user data from the host system 11. For example, the second logical unit count may be equal to the total number of the second logical units searched by the memory management circuit 702 when the second write command is received.

In an exemplary embodiment, in order to facilitate the calculation, the memory management circuit 702 converts the physical unit count and the second logical unit count into corresponding volumes, respectively. The memory management circuit 702 obtains the second number M according to the physical volume corresponding to the physical unit count and a volume (hereinafter, also known as a second logical volume) corresponding to the second logical unit count. Herein, the second logical volume may also be regarded as a total data volume of the valid data stored in the rewritable non-volatile memory module 406 when the second write command is received.

In an exemplary embodiment, the memory management circuit 702 subtracts the second logical volume from the physical volume to obtain a difference value (hereinafter, also known as a second difference value); and then, the memory management circuit 702 obtains the second number M according to the physical volume and the second difference value. For example, the memory management circuit 702 may divide the physical volume by the second difference value to obtain the second number M. For example, the second number M may be calculated according to an equation (3.1) below:

$$M = \frac{P}{P - L_2} \quad (3.1)$$

Herein, M is the second number, P is the physical volume, and $L_2$ is the second logical volume. Each of M, P and $L_2$ is a positive number. If the second number M calculated according to the equation (3.1) is not a positive integer, operations (e.g., calculating for Gauss value or rounding up to decimal places) may further be performed on a result of the equation (3.1). However, in another exemplary embodiment, the physical volume P and the second logical volume $L_2$ may also be inputted to an algorithm or a look-up able, and an output of the algorithm or the look-up table may be used as the second number M. Further, in another exemplary embodiment, additional logical operations may also be added to aforesaid calculation for the second number M.

In another exemplary embodiment, the second number M may also be obtained according to aforesaid reference count, aforesaid physical volume and another data volume (hereinafter, also known as a second storage data volume). The second storage data volume is corresponding to a data volume of valid data or invalid data stored in the rewritable non-volatile memory module 406 when the second write command is received. For example, the second number M may be calculated according to equations (4.1) and (4.2) below:

$$X_2 = \frac{S_2}{P} \times R \quad (4.1)$$

$$M = \frac{R}{X_2} \quad (4.2)$$

Herein, $S_2$ represents a data volume of the invalid data stored in the rewritable non-volatile memory module 406 when the second write command is received, and $X_2$ represents an average data volume of the invalid data stored in each physical erasing unit in the rewritable non-volatile memory module 406 when the second write command is received. In addition, operations (e.g., calculating for Gauss value or rounding up to decimal places) may also be performed on calculation results of the equations (4.1) and (4.2) or any one of the parameters being used. Alternatively, in another exemplary embodiment, simply replacing the parameter $S_2$ in the equation (4.1) by the second logical unit volume $L_2$ used in the equation (3.1), the demand of using the data volume of the valid data stored in the rewritable non-volatile memory module 406 when the second write command is received as the second storage volume may be satisfied accordingly. Accordingly, the corresponding second number M may be obtained according to the average data volume of the valid data (or the invalid data) stored in each physical erasing unit in the rewritable non-volatile memory module 406 when the second write command is received.

In other words, in the foregoing exemplary embodiments, the second number M is instantly determined in response to the usage state of the logical units at the time when the second write command is received. In addition, the usage state of the logical units and the storage state of the valid data in the rewritable non-volatile memory module 406 correspond to each other. Therefore, in an exemplary embodiment, the second number M may also be regarded as being instantly determined in response to the storage state of the valid data stored in the rewritable non-volatile memory module 406 when the second write command is received.

In an exemplary embodiment, the second number M may also be regarded as being obtained according to a relation between a volume of at least one logical unit stored with data at a specific time-point (hereinafter, also known as a second time-point) and the rated volume provided by the rewritable non-volatile memory module 406 for storing the user data. Details regarding so-called rated volume have been described above, which are not repeated hereinafter. Herein, the second time-point refers to a time-point when the second write command is received or when related information is searched according to the second write command.

It is worth mentioning that, during operation of the memory storage device 10, the total number of the logical units stored with data (i.e., the user data) or the corresponding logical volume may change as the host system 11 continues to write data or delete data. Accordingly, in response to the different write commands, each time the number of the physical programming units selected for collecting data in the data merging procedure (or the data volume of the collected data) may be correspondingly changed. For example, according to the exemplary embodiments of FIG. 9A and FIG. 9B, because the obtained second logical volume $L_2$ is greater than the obtained first logical volume $L_1$, the calculated second number M is also greater than the first number N.

In addition, according to the exemplary embodiments of FIG. 9A and FIG. 9B, because the second write command is received after the first write command, a difference between the second number M and the first number N will not be overly large. However, according to other exemplary embodiments of FIG. 9A and FIG. 9B, if one or more write commands instructing to write other data are received in between receiving of the second write command and receiving of the first write command, in response to more data being written into the rewritable non-volatile memory module 406, the difference between the second number M and the first number N may become greater. Relatively, after the first number N is calculated, if the data volume of the data deleted by the host system 11 is greater than the data volume of the data written by the host system 11, it is also possible that the subsequently calculated second number M is less than the first number N, which is depended upon the usage state of the logical units being searched when the write commands are received.

In other words, in an exemplary embodiment, in correspondence to one specific write data to be written into one specific physical programming unit, if it is required to perform the data merging procedure, the number of physical programming units selected for collecting the data required in the data merging procedure (or the data volume of the collected storage data) is positively correlated to the number of the logical units stored with the data (or the corresponding logical volume) or the data volume of the valid data currently stored in the rewritable non-volatile memory module 406 (or the storage area 802). From another perspective, in correspondence to one specific write data to be written into one specific physical programming unit, if it is required to perform the corresponding data merging procedure, the number of the physical programming units selected for collecting the data required in the data merging procedure is negatively correlated to the data volume of the invalid data currently stored in the rewritable non-volatile memory module 406 (or the storage area 802).

It is worth mentioning that, in each of the foregoing exemplary embodiments of FIG. 9A and FIG. 9B, the memory management circuit 702 determines whether it is required to perform the corresponding data merging procedure. However, in another exemplary embodiment, in response to one specific write command, it is also possible that the memory management circuit 702 determines that it is not required to perform the data merging procedure. For example, in another exemplary embodiment of FIG. 9B, if the spare physical erasing units released in the data collecting operation previously performed in space are sufficient, in response to the second write command, the memory management circuit 702 may merely store the second write data corresponding to the second write command into the physical programming unit 810(0) without performing the operation of collecting or moving the data from the physical programming units 940(0) to 940(M−1). In addition, after collecting the data from the physical programming units 930(0) to 930(N−1) or 940(0) to 940(M−1), the physical erasing unit to which any one of the physical programming units 930(0) to 930(N−1) or 940(0) to 940(M−1) belongs may be erased to become the spare physical erasing unit.

Figure 10:
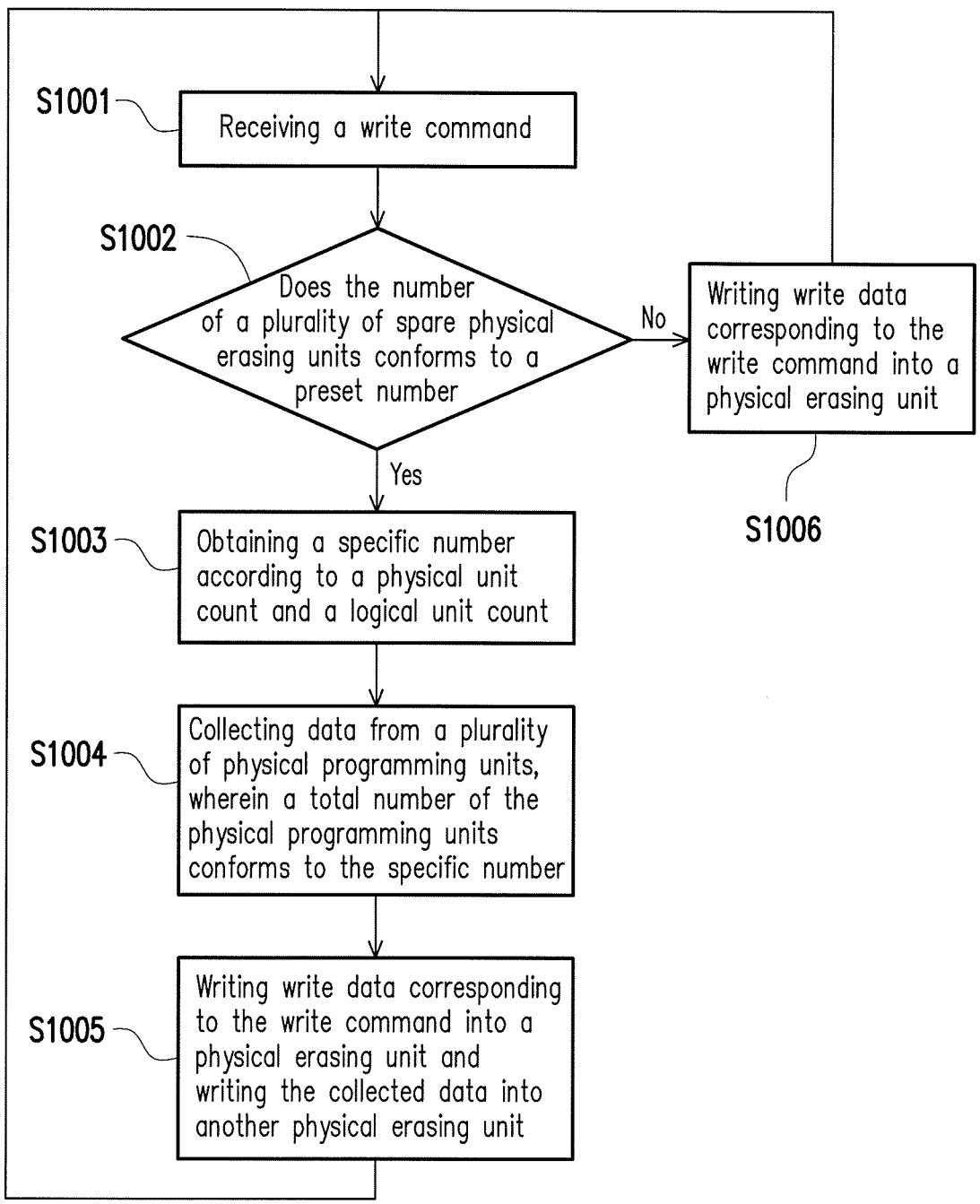
FIG. 10 is a flowchart illustrating a memory management method according to an exemplary embodiment of the disclosure.

FIG. 10 is a flowchart illustrating a memory management method according to an exemplary embodiment of the disclosure. The flowchart illustrated in FIG. 10 is described by using an example in which two write commands are received in succession.

Referring to FIG. 10, in step S1001, a write command (e.g., the first write command) is received. In step S1002, whether the number of a plurality of spare physical erasing units remained in the rewritable non-volatile memory module conforms to a preset number is determined. If determining that the number of the spare physical erasing units remained in the rewritable non-volatile memory module conforms to the preset number in step S1002, a specific number (e.g., the first number) is obtained according to a physical unit count and a logical unit count (e.g., the first logical unit count) in step S1003. In step S1004, data (e.g., the first storage data) are collected from a plurality of physical programming units in the rewritable non-volatile memory module. Particularly, a total number of the physical programming units selected for collecting the data in step S1004 conforms to the specific number (e.g., the first number) obtained in step S1003. In step S1005, write data (e.g., the first write data) corresponding to the write command (e.g., the first write command) are written into one specific physical erasing unit and the data (e.g., the first storage data) collected in step S1004 are written into another physical erasing unit. Further, if determining that the number of the spare physical erasing units remained in the rewritable non-volatile memory module does not meet the preset number in step S1002, only the write data (e.g., the first write data) corresponding to the write command (e.g., the first write command) are written into one specific physical erasing unit in step S1006.

After receiving aforesaid write command, if another write command (e.g., the second write command) is received in step S1001, whether the number of the spare physical erasing units remained in the rewritable non-volatile memory module conforms to the preset number is determined in step S1002. If determining that the number of the spare physical erasing units remained in the rewritable non-volatile memory module conforms to the preset number in step S1002, another number (e.g., the second number) is obtained according to a physical unit count and a logical unit count (e.g., the second logical unit count) in step S1003.

In the present exemplary embodiment, the second logical unit count is greater than the first logical unit count, and the second number is greater than the first number. However, in another exemplary embodiment, if there are data to be deleted as instructed by the host system 11, the second logical unit count may be less than or equal to the first logical unit count, and the second number may be less than or equal to the first number.

Thereafter, in step S1004, data (e.g., the second storage data) are collected from a plurality of physical programming units in the rewritable non-volatile memory module. Particularly, the physical programming units selected for collecting the data in step S1004 conforms to the number (e.g., the second number) obtained in step S1003. In step S1005, the write data (e.g., the second write data) corresponding to the write command (e.g., the second write command) are written into one specific physical erasing unit and the data (e.g., the second storage data) collected in step S1004 are written into another physical erasing unit. Further, if determining that the number of the spare physical erasing units remained in the rewritable non-volatile memory module does not meet the preset number in step S1002, only the write data (e.g., the second write data) corresponding to the write command (e.g., the second write command) are written into one specific physical erasing unit in step S1006.

Nevertheless, steps depicted in FIG. 10 are described in detail as above so that related description thereof is omitted hereinafter. It should be noted that, the steps depicted in FIG. 10 may be implemented as a plurality of program codes or circuits, which are not particularly limited in the disclosure. Moreover, the method disclosed in FIG. 10 may be implemented by reference with above exemplary embodiments, or may be implemented separately, which are not particularly limited in the disclosure.

In summary, the memory management method, the memory control circuit unit and the memory storage device provided by the disclosure are capable of moving the data from different number of the physical programming units in response to different write commands. Accordingly, issues regarding waste of system resource in the data merging procedure may be solved.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a rewritable non-volatile memory module, the rewritable non-volatile memory module comprising a plurality of physical programming units, the physical programming units constituting a plurality of physical erasing units, and the memory management method comprising:
   receiving a plurality of first write commands and first write data corresponding to the first write commands and obtaining a first number according to a physical unit count and a first logical unit count, wherein the physical unit count is corresponding to a total number of a plurality of physical programming units for storing user data from a host system among the physical programming units, the first logical unit count is corresponding to a total number of at least one first logical unit stored with user data from the host system when the first write commands are received, the first number is configured to control a total data volume of a first storage data which is moved during a specific time period with correspondence to a programming triggered by a specific number of the first write commands, and the first number is positively correlated to the specific number of the first write commands and a total data volume of valid data stored in the rewritable non-volatile memory module when the first write commands are received;
   programming at least part of the first write data and moving the first storage data stored in a plurality of first physical programming units among the physical programming units according to the first number;
   after the first write commands are received, receiving a plurality of second write commands and second write data corresponding to the second write commands and obtaining a second number, wherein the second number is configured to control a total data volume of a second storage data which is moved during the specific time period with correspondence to a programming triggered by a specific number of the second write commands, the second number is positively correlated to the specific number of the second write commands and a total data volume of valid data stored in the rewritable non-volatile memory module when the second write commands are received, and the second number is different from the first number;
   programming at least part of the second write data and moving the second storage data stored in a plurality of second physical programming units among the physical programming units according to the second number; and
   erasing at least one physical erasing unit among the physical erasing units, wherein the at least one physical erasing unit being erased includes at least one physical programming unit among the first physical programming units or at least one physical programming unit among the second physical programming units.

2. The memory management method of claim 1, wherein the step of obtaining the second number comprises obtaining the second number according to the physical unit count and a second logical unit count, wherein the second logical unit count is corresponding to a total number of at least one second logical unit stored with the user data from the host system when the second write commands are received.

3. The memory management method of claim 2, wherein the step of obtaining the first number according to the physical unit count and the first logical unit count comprises:
   subtracting a first logical volume corresponding to the first logical unit count from a physical volume corresponding to the physical unit count to obtain a first difference value; and
   obtaining the first number according to the physical volume and the first difference value,
   wherein the step of obtaining the second number according to the physical unit count and the second logical unit count comprises:
   subtracting a second logical volume corresponding to the second logical unit count from the physical volume to obtain a second difference value; and
   obtaining the second number according to the physical volume and the second difference value.

4. The memory management method of claim 2, wherein the step of obtaining the first number according to the physical unit count and the first logical unit count comprises:
   obtaining the first number according to a reference count, a physical volume corresponding to the physical unit count and a first storage data volume,
   wherein the reference count is corresponding to a total number of the physical programming units included in each of the physical erasing units,
   wherein the first storage data volume is corresponding to a data volume of valid data or invalid data stored in the rewritable non-volatile memory module when the first write commands are received,
   wherein the step of obtaining the second number according to the physical unit count and the second logical unit count comprises:
   obtaining the second number according to the reference count, the physical volume and a second storage data volume, wherein the second storage data volume is corresponding to a data volume of valid data or invalid data stored in the rewritable non-volatile memory module when the second write commands are received.

5. The memory management method of claim 1, wherein the step of programming the at least part of the first write data and moving the first storage data comprises:
   writing the at least part of the first write data into a third physical programming unit among the physical programming units; and
   moving the first storage data from the first physical programming units to a plurality of fourth physical programming units among the physical programming units,
   wherein a total number of the fourth physical programming units conforms to the first number,
   wherein the step of programming the at least part of the second write data and moving the second storage data comprises:
   writing the at least part of the second write data into a fifth physical programming unit among the physical programming units; and
   moving the second storage data from the second physical programming units to a plurality of sixth physical programming units among the physical programming units,
   wherein a total number of the sixth physical programming units conforms to the second number.

6. The memory management method of claim 5, wherein each of the physical programming units is a physical page.

7. The memory management method of claim 1, further comprising:
   determining whether a total number of a plurality of spare physical erasing units among the physical erasing units conforms to a preset number;
   performing a data merging procedure if determining that the total number of the spare physical erasing units conforms to the preset number; and
   not performing the data merging procedure if determining that the total number of the spare physical erasing units does not meet the preset number,
   wherein the step of moving the first storage data and the step of moving the second storage data are included in the data merging procedure.

8. The memory management method of claim 2, wherein the first logical unit count is positively correlated to a data volume of valid data stored in the rewritable non-volatile memory module when the first write commands are received,
   wherein the second logical unit count is positively correlated to a data volume of valid data stored in the rewritable non-volatile memory module when the second write commands are received.

9. The memory management method of claim 1, wherein the step of obtaining the first number comprises:
   obtaining the first number according to a relation between a volume of at least one logical unit stored with data at a first time-point and a rated volume provided by the rewritable non-volatile memory module for storing user data,
   wherein the step of obtaining the second number comprises:
   obtaining the second number according to a relation between a volume of at least one logical unit stored with data at a second time-point and the rated volume provided by the rewritable non-volatile memory module for storing the user data,
   wherein the second time-point is later than the first time-point.

10. The memory management method of claim 1, wherein both of the first storage data and the second storage data are valid data.

11. A memory control circuit unit, configured to control a rewritable non-volatile memory module, and the memory control circuit unit comprising:
   a host interface, configured to couple to a host system;
   a memory interface, configured to couple to the rewritable non-volatile memory module, the rewritable non-volatile memory module comprising a plurality of physical programming units, and the physical programming units constituting a plurality of physical erasing units; and
   a memory management circuit, coupled to the host interface and the memory interface,
   wherein the memory management circuit is configured to receive a plurality of first write commands and first write data corresponding to the first write commands and obtain a first number according to a physical unit count and a first logical unit count, wherein the physical unit count is corresponding to a total number of a plurality of physical programming units for storing user data from the host system among the physical programming units, the first logical unit count is corresponding to a total number of at least one first logical unit stored with user data from the host system when the first write commands are received, the first number is configured to control a total data volume of a first storage data which is moved during a specific time period with correspondence to a programming triggered by a specific number of the first write commands, and the first number is positively correlated to the specific number of the first write commands and a total data volume of valid data stored in the rewritable non-volatile memory module when the first write commands are received,
   wherein the memory management circuit is further configured to send a first command sequence which instructs to program at least part of the first write data and move the first storage data stored in a plurality of first physical programming units among the physical programming units according to the first number,
   wherein the memory management circuit is further configured to receive a plurality of second write commands and second write data corresponding to the second write commands and obtain a second number after the first write commands are received,
   wherein the second number is configured to control a total data volume of a second storage data which is moved during the specific time period with correspondence to a programming triggered by a specific number of the second write commands, the second number is positively correlated to the specific number of the second write commands and a total data volume of valid data stored in the rewritable non-volatile memory module when the second write commands are received, and the second number is different from the first number,
   wherein the memory management circuit is further configured to send a second command sequence which instructs to program at least part of the second write data and move the second storage data stored in a plurality of second physical programming units among the physical programming units according to the second number,
   wherein the memory management circuit is further configured to send a third command sequence which instructs to erase at least one physical erasing unit among the physical erasing units, wherein the at least one physical erasing unit being erased includes at least one physical programming unit among the first physical programming units or at least one physical programming unit among the second physical programming units.

12. The memory control circuit unit of claim 11, wherein the memory management circuit obtains the second number according to the physical unit count and a second logical unit count,
wherein the second logical unit count is corresponding to a total number of at least one second logical unit stored with the user data from the host system when the second write commands are received.

13. The memory control circuit unit of claim 12, wherein the operation of obtaining the first number according to the physical unit count and the first logical unit count by the memory management circuit comprises:
subtracting a first logical volume corresponding to the first logical unit count from a physical volume corresponding to the physical unit count to obtain a first difference value; and
obtaining the first number according to the physical volume and the first difference value,
wherein the operation of obtaining the second number according to the physical unit count and the second logical unit count by the memory management circuit comprises:
subtracting a second logical volume corresponding to the second logical unit count from the physical volume to obtain a second difference value; and
obtaining the second number according to the physical volume and the second difference value.

14. The memory control circuit unit of claim 12, wherein the operation of obtaining the first number according to the physical unit count and the first logical unit count by the memory management circuit comprises:
obtaining the first number according to a reference count, a physical volume corresponding to the physical unit count and a first storage data volume,
wherein the reference count is corresponding to a total number of the physical programming units included in each of the physical erasing units,
wherein the first storage data volume is corresponding to a data volume of valid data or invalid data stored in the rewritable non-volatile memory module when the first write commands are received,
wherein the operation of obtaining the second number according to the physical unit count and the second logical unit count by the memory management circuit comprises:
obtaining the second number according to the reference count, the physical volume and a second storage data volume,
wherein the second storage data volume is corresponding to a data volume of valid data or invalid data stored in the rewritable non-volatile memory module when the second write commands are received.

15. The memory control circuit unit of claim 11, wherein the first command sequence instructs to write the at least part of the first write data into a third physical programming unit among the physical programming units and move the first storage data from the first physical programming units to a plurality of fourth physical programming units among the physical programming units,
wherein a total number of the fourth physical programming units conforms to the first number,
wherein the second command sequence instructs to write the at least part of the second write data into a fifth physical programming unit among the physical programming units and move the second storage data from the second physical programming units to a plurality of sixth physical programming units among the physical programming units,
wherein a total number of the sixth physical programming units conforms to the second number.

16. The memory control circuit unit of claim 15, wherein each of the physical programming units is a physical page.

17. The memory control circuit unit of claim 11, wherein the memory management circuit is further configured to determine whether a total number of a plurality of spare physical erasing units among the physical erasing units conforms to a preset number,
wherein the memory management circuit is further configured to perform a data merging procedure if determining that the total number of the spare physical erasing units conforms to the preset number,
wherein the memory management circuit does not perform the data merging procedure if determining that the total number of the spare physical erasing units does not meet the preset number,
wherein the operation of sending the first command sequence and the operation of sending the second command sequence by the memory management circuit are included in the data merging procedure.

18. The memory control circuit unit of claim 12, wherein the first logical unit count is positively correlated to a data volume of valid data stored in the rewritable non-volatile memory module when the first write commands are received,
wherein the second logical unit count is positively correlated to a data volume of valid data stored in the rewritable non-volatile memory module when the second write commands are received.

19. The memory control circuit unit of claim 11, wherein the memory management circuit obtains the first number according to a relation between a volume of at least one logical unit stored with data at a first time-point and a rated volume provided by the rewritable non-volatile memory module for storing user data,
wherein the memory management circuit obtains the second number according to a relation between a volume of at least one logical unit stored with data at a second time-point and the rated volume provided by the rewritable non-volatile memory module for storing the user data,
wherein the second time-point is later than the first time-point.

20. The memory control circuit unit of claim 11, wherein both of the first storage data and the second storage data are valid data.

21. A memory storage device, comprising:
a connection interface unit, configured to couple to a host system;
a rewritable non-volatile memory module comprising a plurality of physical programming units, and the physical programming units constituting a plurality of physical erasing units; and
a memory control circuit unit, coupled to the connection interface unit and the rewritable non-volatile memory module, wherein the memory control circuit unit is configured to receive a plurality of first write commands and first write data corresponding to the first write commands and obtain a first number according to a physical unit count and a first logical unit count, wherein the physical unit count is corresponding to a total number of a plurality of physical programming units for storing user data from the host system among the physical programming units, the first logical unit count is corresponding to a total number of at least one first logical unit stored with user data from the host system when the first write commands is received, the first number is configured to control a total data volume of a first storage data which is moved during a specific time period with correspondence to a programming triggered by a specific number of the first write commands, and the first number is positively correlated to the specific number of the first write commands and a total data volume of valid data stored in the rewritable non-volatile memory module when the first write commands are received, wherein the memory control circuit unit is further configured to send a first command sequence which instructs to program at least part of the first write data and move the first storage data stored in a plurality of first physical programming units among the physical programming units according to the first number, wherein the memory control circuit unit is further configured to receive a plurality of second write commands and second write data corresponding to the second write commands and obtain a second number after the first write commands are received, wherein the second number is configured to control a total data volume of a second storage data which is moved during the specific time period with correspondence to a programming triggered by a specific number of the second write command, the second number is positively correlated to the specific number of the second write commands and a total data volume of valid data stored in the rewritable non-volatile memory module when the second write commands are received, and the second number is different from the first number, wherein the memory control circuit unit is further configured to send a second command sequence which instructs to program at least part of the second write data and move the second storage data stored in a plurality of second physical programming units among the physical programming units according to the second number, wherein the memory control circuit unit is further configured to send a third command sequence which instructs to erase at least one physical erasing unit among the physical erasing units, wherein the at least one physical erasing unit being erased includes at least one physical programming unit among the first physical programming units or at least one physical programming unit among the second physical programming units.

22. The memory storage device of claim 21,
wherein the memory control circuit unit obtains the second number according to the physical unit count and a second logical unit count,
wherein the second logical unit count is corresponding to a total number of at least one second logical unit stored with the user data from the host system when the second write commands are received.

23. The memory storage device of claim 22, wherein the operation of obtaining the first number according to the physical unit count and the first logical unit count by the memory control circuit unit comprises:
subtracting a first logical volume corresponding to the first logical unit count from a physical volume corresponding to the physical unit count to obtain a first difference value; and
obtaining the first number according to the physical volume and the first difference value,
wherein the operation of obtaining the second number according to the physical unit count and the second logical unit count by the memory control circuit unit comprises:
subtracting a second logical volume corresponding to the second logical unit count from the physical volume to obtain a second difference value; and
obtaining the second number according to the physical volume and the second difference value.

24. The memory storage device of claim 22, wherein the operation of obtaining the first number according to the physical unit count and the first logical unit count by the memory control circuit unit comprises:
obtaining the first number according to a reference count, a physical volume corresponding to the physical unit count and a first storage data volume,
wherein the reference count is corresponding to a total number of the physical programming units included in each of the physical erasing units,
wherein the first storage data volume is corresponding to a data volume of valid data or invalid data stored in the rewritable non-volatile memory module when the first write commands are received,
wherein the operation of obtaining the second number according to the physical unit count and the second logical unit count by the memory control circuit unit comprises:
obtaining the second number according to the reference count, the physical volume and a second storage data volume,
wherein the second storage data volume is corresponding to a data volume of valid data or invalid data stored in the rewritable non-volatile memory module when the second write commands are received.

25. The memory storage device of claim 21, wherein the first command sequence instructs to write the at least part of the first write data into a third physical programming unit among the physical programming units and move the first storage data from the first physical programming units to a plurality of fourth physical programming units among the physical programming units,
wherein a total number of the fourth physical programming units conforms to the first number,
wherein the second command sequence instructs to write the at least part of the second write data into a fifth physical programming unit among the physical programming units and move the second storage data from the second physical programming units to a plurality of sixth physical programming units among the physical programming units,
wherein a total number of the sixth physical programming units conforms to the second number.

26. The memory storage device of claim 25, wherein each of the physical programming units is a physical page.

27. The memory storage device of claim 21, wherein the memory control circuit unit is further configured to determine whether a total number of a plurality of spare physical erasing units among the physical erasing units conforms to a preset number, wherein the memory control circuit unit is further configured to perform a data merging procedure if determining that the total number of the spare physical erasing units conforms to the preset number, wherein the memory control circuit unit does not perform the data merging procedure if determining that the total number of the spare physical erasing units does not meet the preset number, wherein the operation of sending the first command sequence and the operation of sending the second command sequence by the memory control circuit unit are included in the data merging procedure.

28. The memory storage device of claim 22, wherein the first logical unit count is positively correlated to a data volume of valid data stored in the rewritable non-volatile memory module when the first write commands are received, wherein the second logical unit count is positively correlated to a data volume of valid data stored in the rewritable non-volatile memory module when the second write commands are received.

29. The memory storage device of claim 21, wherein the memory control circuit unit obtains the first number according to a relation between a volume of at least one logical unit stored with data at a first time-point and a rated volume provided by the rewritable non-volatile memory module for storing user data, wherein the memory control circuit unit obtains the second number according to a relation between a volume of at least one logical unit stored with data at a second time-point and the rated volume provided by the rewritable non-volatile memory module for storing the user data, wherein the second time-point is later than the first time-point.

30. The memory control circuit unit of claim 21, wherein both of the first storage data and the second storage data are valid data.

* * * * *